Nov. 30, 1954  R. P. HUTCHINS  2,695,459
DESOLVENTIZER AND TOASTER
Filed Sept. 20, 1949  5 Sheets-Sheet 1

INVENTOR.
Ralph P. Hutchins,
BY
Parker, Prochnow & Farmer,
Attorneys.

Nov. 30, 1954  R. P. HUTCHINS  2,695,459
DESOLVENTIZER AND TOASTER
Filed Sept. 20, 1949  5 Sheets-Sheet 2

INVENTOR.
Ralph P. Hutchins,
BY Parker, Crochmor & Farrell
Attorneys.

Nov. 30, 1954

R. P. HUTCHINS 2,695,459

DESOLVENTIZER AND TOASTER

Filed Sept. 20, 1949

INVENTOR.
Ralph P. Hutchins,
BY
Parker, Trichmor-Farmer,
Attorneys.

United States Patent Office 2,695,459
Patented Nov. 30, 1954

2,695,459

DESOLVENTIZER AND TOASTER

Ralph P. Hutchins, Piqua, Ohio, assignor to The French Oil Mill Machinery Company, Piqua, Ohio Application September 20, 1949, Serial No. 116,809

16 Claims. (Cl. 34—17)

This invention relates to the desolventizing and toasting of expressed solids or flakes obtained from a continuous solvent extraction system. More particularly it relates to an improved apparatus and process for continuously removing the solvent from the extracted flakes and solids and then toasting the solids or flakes so freed of the solvent preferably all in one continuous handling and operation.

An object of the invention is to provide an improved method and apparatus for removing adhering solvent from extracted solids, which will effectively filter dust from the solvent vapors and provide a dust-free recovered solvent vapor; which requires a minimum of sparging steam after starting; with which the solvent removal may be carried on at, above or below atmospheric pressure; and which will provide recovered solvent with a minimum of water mixed therewith.

Another object of the invention is to provide an improved method and apparatus for removing solvent adhering to extracted solids from a continuous solvent extraction system, and then toasting the solvent-free solids; with which live steam is employed as the chief evaporating agent for the solvent and for humidifying solids for toasting; with which the solvent will be rapidly and surely eliminated in a manner to permit recovery; with which moisture is added to solids in a uniform manner without formation of water balls; with which the protein of the solids is very quickly subjected to heat and caused to pass through a certain and desired stage of coagulation more rapidly than has ordinarily been possible heretofore; with which the final texture, color and nutrition of the solids will be greatly improved; and which will yield a meal of excellent colors and quality.

Another object of the invention is to provide an improved, continuous type apparatus for desolventizing the solids and toasting them which will be relatively compact, efficient, of large capacity, and inexpensive.

Another object of the invention is to provide an improved method for desolventizing solids and preparing the solids for toasting in a single, continuous operation without intermediate handling; with which recovery of solvent will be a maximum and a high quality of toasted solids may be obtained; and which may be operated at, above or below atmospheric pressure as desired.

Various other objects and advantages will be apparent from the following description of one example of the invention, and the novel features will be particularly pointed out hereinafter in connection with the appended claims.

Figure 6:
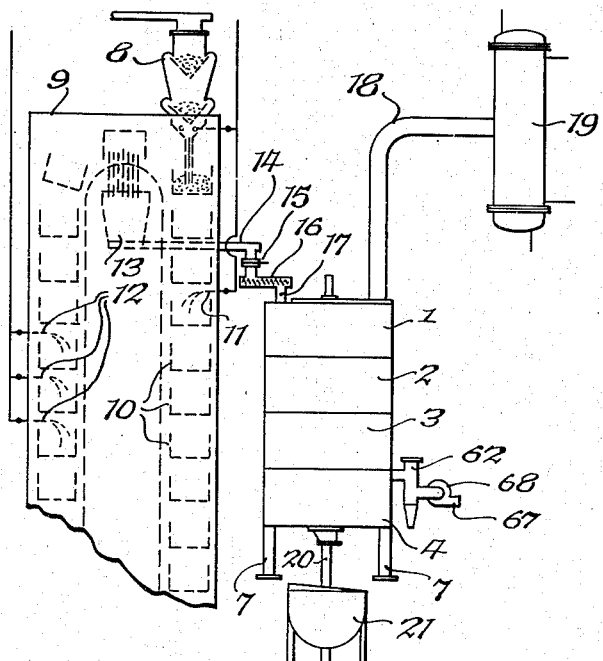
Fig. 6 is a diagram on a small scale illustrating the relationship of this apparatus to a solvent extraction system.

In the illustrated embodiment of the invention, and referring first particularly to Fig. 6, the apparatus includes a structure formed of a plurality of connected sections 1, 2, 3 and 4 arranged in superposed relation, and the lower section is supported on suitable legs 7. Solids to be extracted, such as comminuted soybeans, are introduced through a hopper or feed device 8 into an upright housing 9 where they are discharged in batches into buckets or baskets 10 with open tops and perforated bottoms that pass in succession beneath the feed hopper so as to be filled thereby. These buckets, as soon as filled, descend on an endless carrier, during which they are sprayed with a solvent or miscella through a spray device 11. As the buckets descend the solvent or miscella seeps from basket to basket, and then during their ascent the buckets are subjected to a spraying with pure solvent through a spray device 12 so that this solvent also may seep through the solids and from basket to basket in the ascending column of baskets.

The buckets, upon reaching the top of the ascending column, are inverted to dump the contents thereof into a receiver 13 from which the solids are removed, such as by screw conveyor in a horizontal conduit 14 and discharged past a gate 15 into a feeding screw conveyor 16 that conveys the solids from which oils or other constituents have been extracted in the housing 9 to an inlet conduit 17 that discharges into the upper part of the chamber of the top section 1. A vent conduit 18 leads from the upper part of the top section 1 to a condenser 19 and the solids, after being desolventized and toasted in their passage through the chambers 1 to 4, are discharged through a conduit 20 into a cooler 21.

Any suitable process or apparatus may be employed for the solvent extraction operation, but the type of apparatus illustrated in housing 9 is similar to that disclosed, for example, in United States Patent No. 2,225,799, December 24, 1940, and also in copending application, Serial No. 82,079, filed March 18, 1949, now Patent No. 2,641,536, June 9, 1953. The particular apparatus employed in the solvent extraction operation is not material in the present invention, which relates to the desolventizing of the extracted solids and the toasting of the same in a single operation. This desolventizing and toasting apparatus is shown in greater detail in Figs. 1 to 5 to which reference should now be had.

Figure 1:
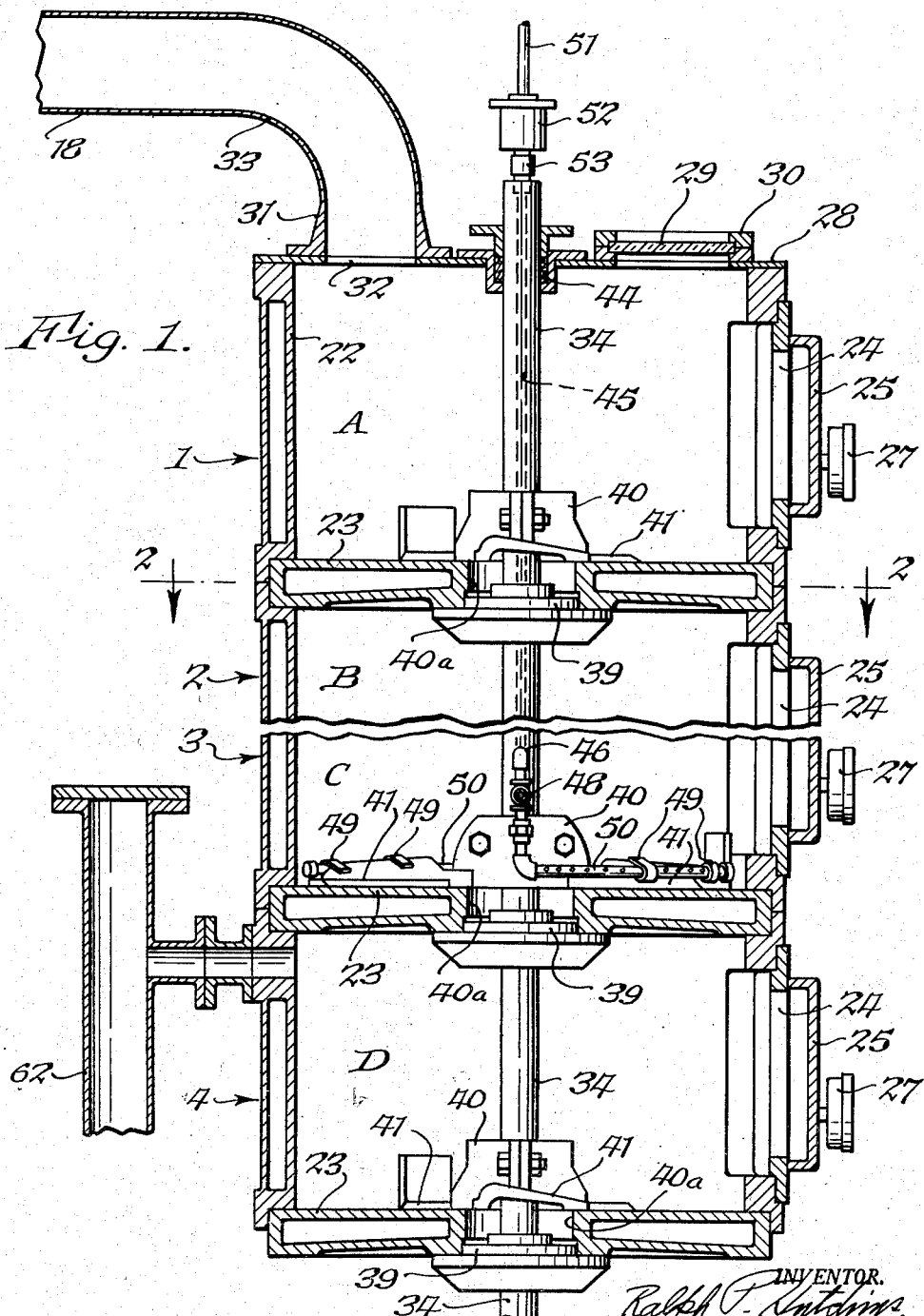
Fig. 1 is a fragmentary sectional elevation through apparatus constructed in accordance with this invention and suitable for practicing the improved process.

The housing sections 1 to 4 (the number may be varied) are formed of a plurality of cylindrical shells 22 open at their ends, and disposed in superposed relation, end to end, as shown in Fig. 1, with hollow floors or intermediate plates 23 disposed between abutting ends of the shells and also forming the bottom of the lowermost section 4. The cylindrical shells 22 and the floors or bottoms 23 are steam-jacketed, that is, they have steam chambers therein so that when steam is admitted thereto, they are heated and serve to heat the chamber contained in each section. For convenience, these chambers are identified as chambers A, B, C and D arranged one above the other. The shell 22 of each section is provided with a door opening 24 which is normally closed by a door 25, Fig. 4, mounted on hinges 26, Fig. 2. A thermometer 27 is provided in each door so as to indicate the temperature of the chamber closed by that door.

A cover 28 is disposed across the open, upper end of the upper section 22, and this cover may have a sight glass 29 removably confined in position by a clamp ring 30. A tubular boss 31 is also secured to the cover 28, across an outlet opening 32 in the cover, and this boss 31 is connected by a tubular elbow 33, which is part of conduit 18, to the condenser 19, see Fig. 4. The inlet conduit 17 (Fig. 4) also opens downwardly through the cover 28 so as to discharge the solids into the uppermost chamber. An upright shaft 34, Fig. 1, passes upwardly through all of the bottoms 23 and through the cover 28. At its lower end, Fig. 4, the shaft 34 is connected by a coupling 35 to a variable speed mechanism 36 which is driven by a V-belt drive 37 from an electric motor 38.

The shaft is provided with a stuffing box closure 39, Fig. 1, where it passes through each floor 23, so as to seal or close each opening through which it passes. The shaft also carries, in each chamber, a head 40 which is tightly coupled thereto and bridges and closes the opening 40a in the section 23 through which the shaft loosely passes. Each head 40 carries one or more stirrer arms 41, Fig. 2, preferably two arms diametrically disposed. These arms 41 sweep closely over each floor section and rotate in the direction of the arrow 42 in Fig. 2. The leading edge 43 of each arm is bevelled so as to scrape the floor clean of solids and the solids pass or tumble over the upper face of the stirrer arm.

Figure 2:
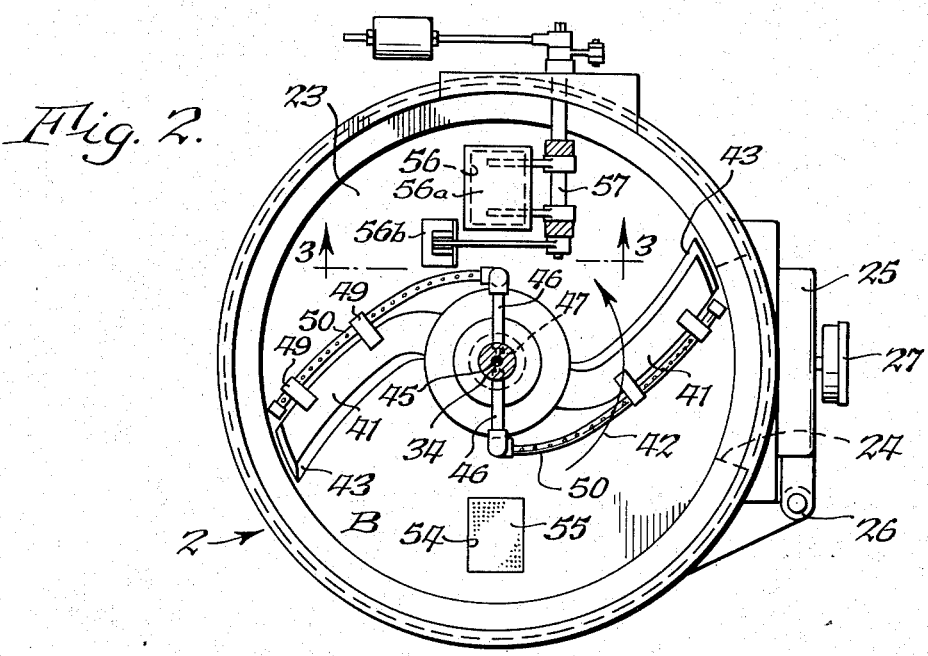
Fig. 2 is a sectional plan of the same, with the section taken approximately along the line 2—2 of Fig. 1 just along the under face of the floor.

At its upper end the shaft 34 passes through a stuffing box 44, Fig. 1. The shaft 34 has an axial passage 45 leading from its upper end downwardly for a number of the chambers, such as, as far as the chamber C. In each chamber B and C a pipe 46 is screwed into the shaft radially thereof (Fig. 2) and there it communicates with a short branch passage 47 that opens into the main passage 45. Each pipe 46 contains a valve 48 (Fig. 1) and beyond the valve an end or portion 50 extends horizontally along the trailing edge of each stirrer arm 41 in that chamber for approximately its full length. The pipe portion 50 is secured to the trailing edge of the arm in any suitable manner such as by clamps 49 (Figs. 1 and 2). The pipe end 50 is slightly below the upper surface of the arm 41, so that the solids which are stirred by the arm and which fall or cascade over the arm will pass over the pipe end 50. The pipe end 50 is provided with small apertures disposed along its length for the discharge of live steam beneath the solids cascading thereover, as will be explained presently.

A steam pipe 51, Fig. 1, is disposed in axial alinement with the upper end of the shaft 34 and is connected through a suitable valve 52 to a fitting 53 which has a rotary coupling to or seating in the passage 45 in the upper end of the shaft 34. Thus the shaft 34, during its rotation, may receive steam from the pipe 51 and this steam travels along the passage 45 to the pipes 46 in the chambers A, B and C from which it is discharged into the solids being stirred. The floor 23 of each chamber A and B is provided with a vent passage 54, Fig. 2, that extends through the floor from face to face, which is closed by a perforated plate 55 so that adjoining chambers A, B and C are at all times in communication with one another through the perforated plates 55, yet the perforations in those plates are so small that appreciable amounts of the solids cannot pass through the perforations.

Figure 3:
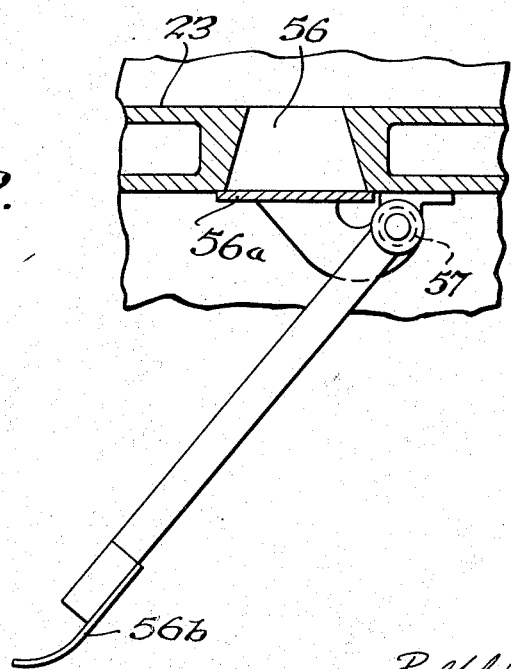
Fig. 3 is a sectional elevation of a portion of the bottom of one of the chambers to show the control of the passage by the float and valve, and through which the solids are discharged from chamber to chamber.
Figure 4:
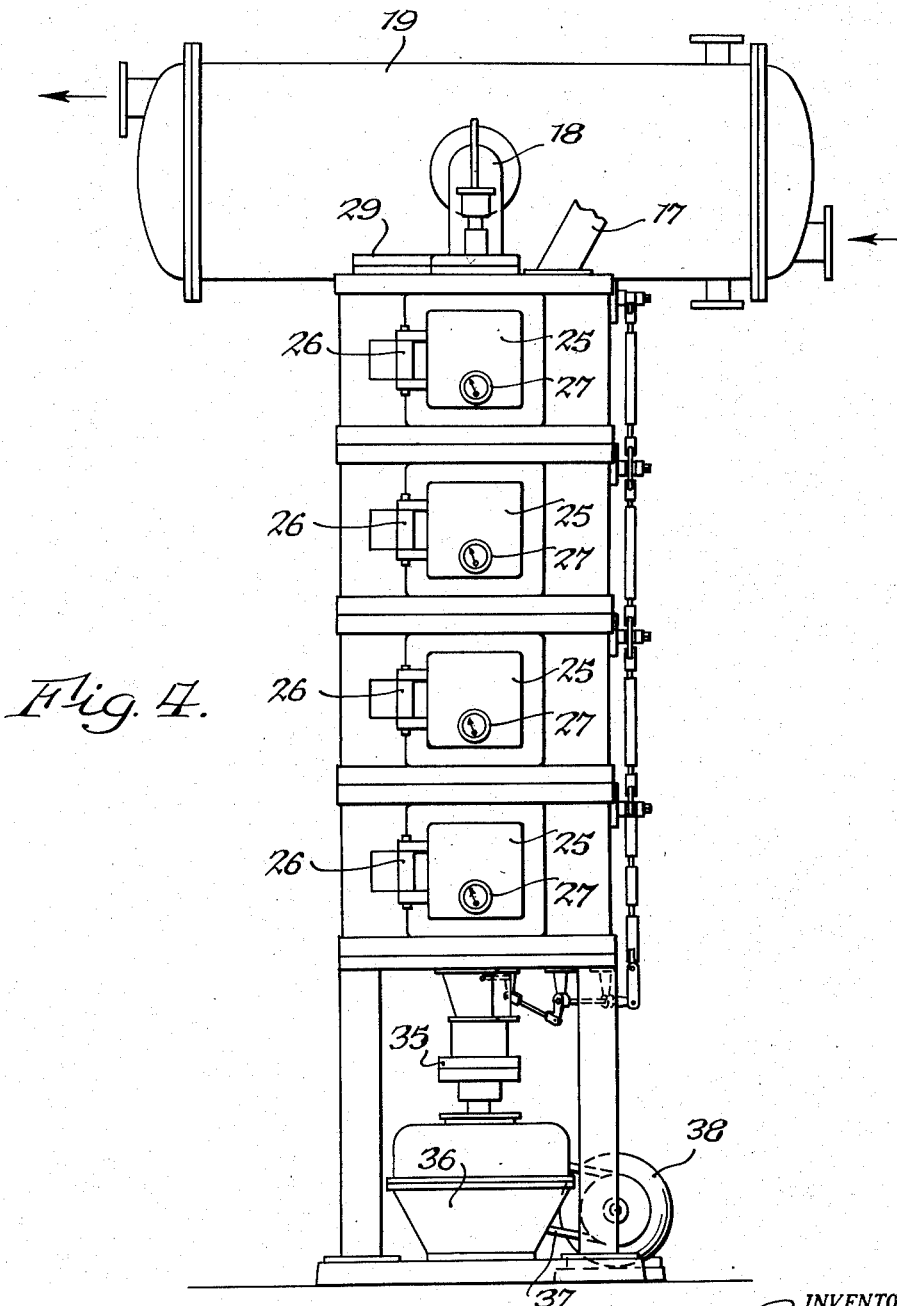
Fig. 4 is a front elevation of the apparatus shown in Fig. 1, with the condenser attached.

Each floor section 23 is also provided with a discharge opening 56 (Fig. 2) which is controlled by a gate 56a, as shown in Fig. 3, and this gate or closure may be operated to open position by a tubular shaft 57, see Fig. 2, that extends to the exterior of the chamber and terminates in a squared or non-circular end over which an operating handle may be fitted when hand operation of the gate shaft is desired. The gates will be operated by external arms connected to floats 56b. The float 56b in each kettle controls the level in this kettle by operating the gate immediately below. This is disclosed in a copending application Serial No. 91,260, filed May 4, 1949, now Patent No. 2,653,084, September 22, 1953.

Figure 5:
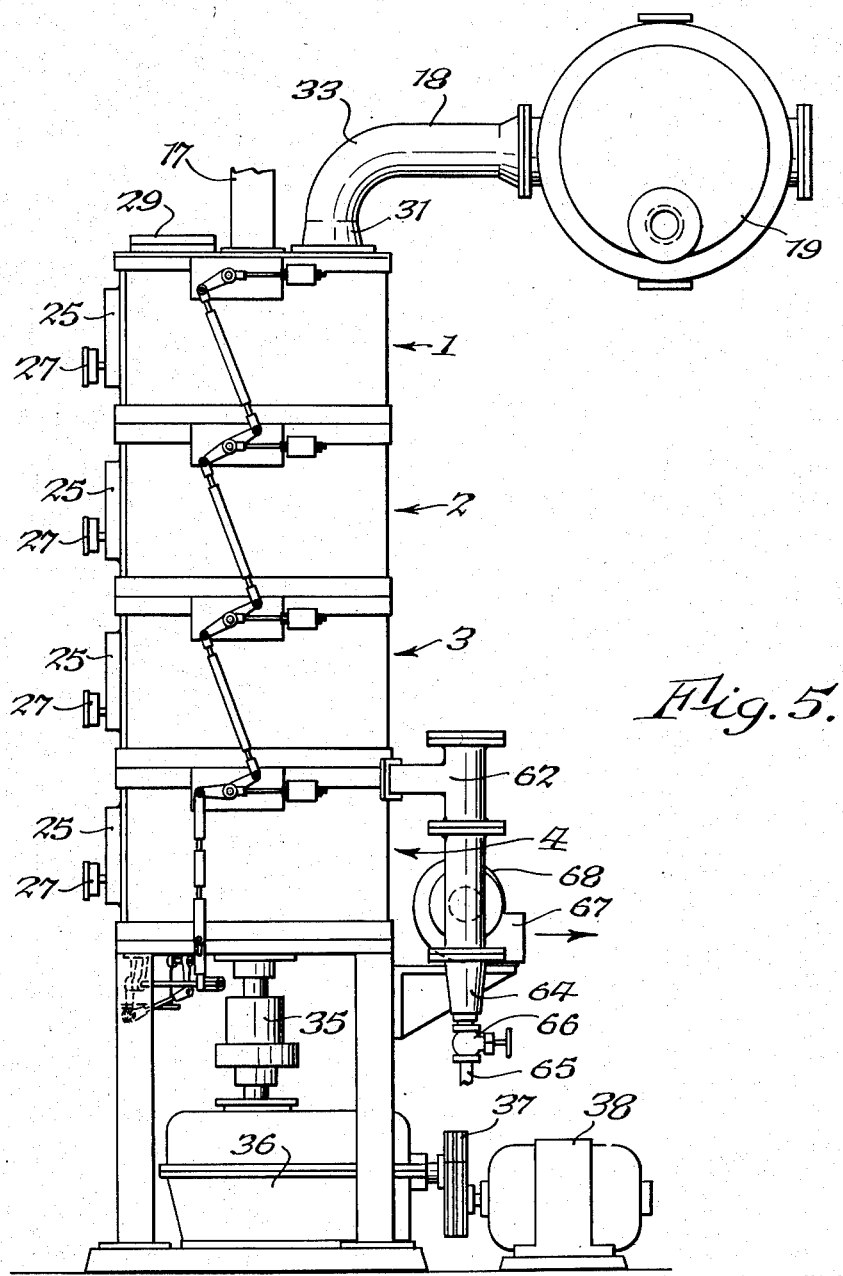
Fig. 5 is a side elevation of the apparatus shown in Fig. 4.

The chamber D is provided with an outlet conduit 62, Fig. 1, which extends vertically along one side of the structure and at its lower end terminates in a converging section 64, Fig. 5, leading to a pipe 65 having therein a valve 66. This pipe 65 leads to a condensate drain. A blower 68 of the centrifugal type is disposed along one side of the conduit 62 and at its suction side is connected to the side wall of conduit 62, and the outlet side 67 of this blower discharges air and vapors drawn from the chamber D through the conduit 62, and enables the meals to be dried to a proper moisture content for subsequent cooling, storage or other processing.

In the operation of such a device, the chamber A is first partially filled with a batch of the extracted solids from the solvent extraction apparatus, the solids being introduced through the inlet 17, with all of the gates 56a of the superposed sections closed. Steam is admitted to the jackets of the side walls and floors of the chambers, and at the same time steam passes downwardly and through the upper end of the shaft into the chambers B and C and may be discharged at the rear of the trailing edge of each stirrer arm in those chambers. The shaft 34 is rotated by motor 38, and as the solids in chamber A are heated, some of the vapor therefrom will be driven off and conducted to the condenser. The gate in the bottom of the chamber A is opened by the float in chamber A so that there is controlled continuous discharge of solids into the next lower chamber B, during which fresh extracted solids are admitted to chamber A. The solids are in a similar manner passed downwardly from chamber to chamber under control of the floats, each float controlling the level in its chamber, so as to maintain a constant level of solids in each chamber. This procedure continues and the solids are passed successively from chamber to chamber until all of the chambers are in operation.

The operation is continued, and after the solids are freed of adhering solvent, they are dried or toasted in the chamber D or in the usual toasting apparatus. The solids in the lower chamber D, after drying and some toasting, are discharged into the cooler 21. Thus, the extracted solids pass in succession downwardly from chamber to chamber, and are first freed of adhering solvent and then dried and toasted in one operation or handling. The individual valve in each pipe 46 makes it possible to control the amount of live steam admitted directly to each chamber B or C from the outside. It will be noted that the chamber B opens continuously into chamber A through the perforated plate 55 in the bottom of chamber A, and chamber C similarly opens continuously into chamber B through the perforated plate 55 in the bottom of chamber B, so that the vapors liberated in chambers B and C will rise into the chamber A and, if not condensed in chamber A, will pass out to the condenser 19. At the same time, vapors and moisture liberated in the chamber D, which has no appreciable amount of solvent, will be removed from the header 62 and the blower 67. The thermometer 27 indicates the temperature in each chamber and the steam added to the jackets of the walls and fronts of each chamber may be individually controlled so as to make it possible to vary the temperature individually in the different chambers.

The extracted solids or flakes which enter the upper chamber A usually carry from about 0.5% to 1% or more of oil and also with a commercial grade of solvent coming from the extraction apparatus. An example of such a solvent is hexane and the amount of the adhering solvent usually varies from about 1 pound of solvent for each 1½ pounds of solids or flakes to 1 pound of solvent for every 0.8 pound of flakes or solids, depending upon the nature of the material being extracted. For soybeans, the adhering solvent is usually about 1 pound of solvent for each 1½ pounds of solids or flakes.

The temperature varies in the various chambers. For the top chamber A, it preferably is kept at about 140° to 180° F. In the chamber B, the temperature preferably is from about 212° to 220° F. In chamber C, the temperature preferably is kept at about 220° to 230° F. For chamber D, the temperature preferably is kept at about 220° to 240° F. The number of chambers, of course, may be varied, but the temperature in the successive chambers will vary from top to bottom in an orderly manner such that the initial temperature would be slightly below the boiling point of water (212° F.) and the final temperature in the lower chamber would be from about 220° to 240° F. These exact degrees are not sharply critical and may be varied to some extent, but the temperature in the chambers will vary from slightly below 212° in the top chamber to well above 212° in the lowermost chamber. The temperatures will vary according to the material handled and the solvent used. In the top kettle or kettles, it will be slightly over the boiling point of the solvent (hexane 142–154° F.) and under 212° F. In the second series of kettles, it will be over 212° F. In the third series, it will be usually between 220° to 240° F.

It will be noted that live steam may be admitted as desired to chambers B and C where it first strips the last traces of solvent and then condenses in kettle A to give up its heat of vaporization, and it has been found that this intimate steam contact with the flakes provides such uniform humidification to every flake particle that no water balls are formed in the solids. The steam condensing in the top chamber adds moisture to the solids to prepare them for the subsequent toasting operation in the chamber D or a separate drier and toaster, and also provides a substantial amount of latent and direct heat to vaporize the solvent that adheres to the solids from the solvent extraction operation and is carried into chamber A. Steam in condensing gives off its latent heat of vaporization and this is imparted to the solids and adherent solvent, so that most of the solvent, usually from about 95% to 98% of the solvent, is vaporized very quickly and passes to the condenser where it is condensed outside of the chamber A and may be recovered for treatment of further solids in the extraction operation. The amount of steam condensation, and the amount of humidification given the flakes is controlled by the relative control of the open steam application and the jacket steam pressure.

The action of the condensed steam in the top chamber serves two purposes, in that it yields a large amount of latent heat of vaporization to vaporize the solvent, and humidifies the meal or solids to a point where exceptionally good toasting is possible. The top layer of flakes in the top kettle is saturated with solvent. As the solvent vapors are driven off by the heat of vaporization and application of heat through the steam jacketed walls, the solvent vapor and any steam with it is effectively scrubbed of dust by the bed of solvent-wet flakes that might otherwise be carried off with the vapors. This gives substantially dust-free vapors, and clogging of the condenser is avoided. The moisture of the solids saturated with solvent as the solids enter the top chamber A will be 10% to 15% (solvent free basis). Enough steam is condensed in the solids in chamber A to bring the moisture to about 20% to 25%. In chamber B some steam may be added through pipes 50 to quickly raise the temperature of the solids to facilitate elimination of the moisture and expedite the toasting for the reason that the solvent is substantially removed in chamber A.

The apparatus in a general way is somewhat like a conventional, atmospheric stack toaster except that the chambers are vapor-tight and some of the details have been varied. It will be noted that the humidification of the meal is very uniform as well as gradual and progressive, which resists the formation of water balls, and the heat is applied so intimately to each particle that the proteins will coagulate more quickly than is ordinarily the case. The final toasted product appears to have a very fine texture, color and nutrition.

It will be observed that the operation in chambers A, B, C and D may be carried on at, above or below atmospheric pressure, as desired. Any number of chambers A, B, C and D may be employed. The operation is continuous, and the system is closed, so that sparging steam is generated, condensed and regenerated repeatedly. For some materials, it may be unnecessary to introduce sparging steam from the outside, and also after starting. The vents from one or more of the lower chambers, such as chamber C may, if desired, be closed so as to develop a small amount of pressure. The sparging steam rises to the chamber A and condenses on the solids or flakes, passes downwardly with the solids or flakes, is then regenerated by heat into steam, rises again to chamber A and condenses again. In rising as steam, it aids in carrying off the solvent, and in condensing it gives moisture to the solids to facilitate their toasting. Soybean meal toasted in this manner has an unusually brilliant and pleasing golden color.

Figure 7:
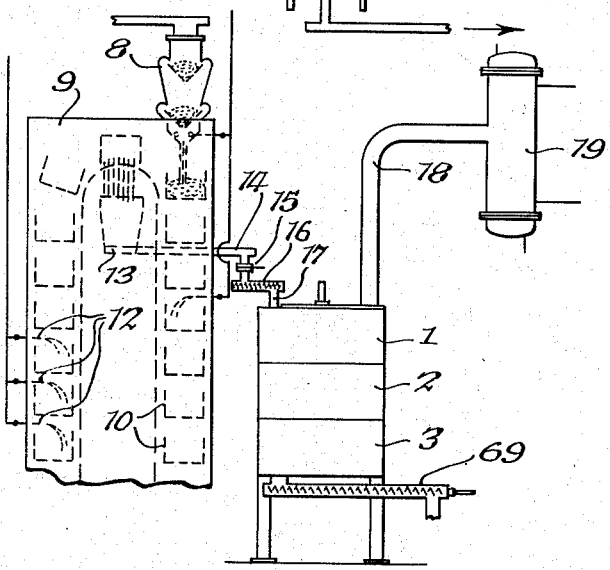
Fig. 7 is a diagram similar to Fig. 6 of a modified form of the invention operating below atmospheric pressure.

The embodiment of the invention illustrated in Fig. 7 is similar to that illustrated in Figs. 1 to 6 except that the last section 4 has been omitted and replaced by a discharge feeder in the nature of a screw conveyor 69 which receives the solids discharged from the opening 56 in the floor of the section 3 and serves to progressively remove the solids from the bottom of the chamber in section 3. The section 4 is in reality a toaster and drier in which the solids are dried and toasted, and this toasting or drying operation may be performed either in the section 4 as shown in Figs. 1 to 6, or the solids from the section 3 may be removed by the conveyor 69 and discharged into a separate treating apparatus in which the solids are either dried and toasted as in the usual drying and toasting apparatus, or they may be dried with a minimum of heat treatment and hence cause a minimum of coagulation of the protein. The solids removed by the conveyor 69 may be used for a subsequent extraction operation in which protein is extracted as a part of the preparation of commercial protein.

The apparatus of Figs. 1 to 7 is suitable for operation either under atmospheric pressure, at atmospheric pressure, or above atmospheric pressure. Since the temperature in the various chambers increases progressively until in the third chamber it is above the boiling point of water at the particular atmospheric pressure in that chamber, it follows that the heat from the steam jacket in the walls of section 3 will evaporate the water from the solids or flakes and generate steam. The generation of steam in the chamber of section 3 tends to build up a pressure in that chamber, and the vapors so created pass upwardly into the chamber of section 2 where they heat and moisten the solids in the chamber of section 2 and carry with them into the chamber of section 1 any adherent solvents on the solids.

The temperature in the chamber of section 1 is regulated to be always above the vaporization temperature of the solvent but below the vaporization temperature of steam, with the result that the steam condenses in chamber A and furnishes latent heat which vaporizes the solvent adherent to the solids in the chamber A of section 1. Suction in the condenser 19 pulls off the solvent vapors from chamber A, and condenses them outside of chamber A. The openings 56 by which the solids pass from chamber to chamber will not be open in any floor except when a fairly heavy layer of solids or flakes is covering it, but the chambers A, B and C are always in communication with each other through the perforated plates 55 that are always open. The steam and vapor may thus pass in a direction upwardly from the lower chamber to the upper chamber which is a counter direction to the descending solids. This passage of vapors upwardly is facilitated by the stirring of the solids in each chamber by the stirrer arms that sweep the floors of the chambers and dislodge the particles that are over the perforated plates 55. The stirrer arms keep the solids in each chamber from packing, so that the solids will be sufficiently loose to enable the vapors to pass upwardly therethrough and have intimate contact with all the solids in that chamber.

In Figs. 1 to 6, the fan or blower 68 operates to draw off moisture vapors from the chamber of the fourth section and is never operated in a manner to create any vacuum in the chambers of any of the sections 1 to 3, but has a capacity low enough and a low enough static head so that it merely overcomes the pressure drop in the moisture vapor handling system. The pressure generated in the chambers of the second and third sections forces the vapor to pass upwardly into the chamber A of the first section where they are removed through pipe 18 and condensed and recovered in condenser 19. If the apparatus should, for any reason, be operating at a lower pressure in the chamber of the fourth section, some moisture from the chamber of the third section might descend into the fourth section, but this would be moisture vapor only and would involve no solvent vapor.

When a vacuum operation of the unit is desired, it is preferable to eliminate the fourth section and substitute the conveyor 69 for removing the desolventized solids. The function of the fourth section would be handled in a separate unit, so that the chambers of all of the sections 1, 2 and 3 could be operated under a partial vacuum. In operating under partial vacuum, there would be sufficient suction applied through the condenser 19 to create a partial vacuum in the chamber A of section 1, so that the vaporization temperatures of both solvent and steam would be lowered. The partial vacuum in chamber A would be communicated to the chambers B and C although the vacuum in the chambers would decrease along the series. Thus the vacuum producing equipment that would be connected to the condenser 19 would not entirely overcome any pressure generation of steam in chamber C of section 3.

Operation at atmospheric pressure is determined by the amount of suction applied to condenser 19.

In the operation at pressures below atmospheric, it is possible to operate this unit at materially reduced temperatures throughout the cycle so that the final and maximum temperature is under 150° F. Under such conditions, a minimum of protein coagulation is obtained, and the protein is treated so uniformly to this minimum of heat that a maximum of water solubility is retained. Such a process can be substituted for toasting in the equipment as described, to produce a material that will yield a maximum of soluble protein for subsequent extraction from the solids.

It will be understood that various changes in the details and arrangements of parts, which have been herein described and illustrated in order to explain the nature of the invention, may be made by those skilled in the art within the principle and scope of the invention as expressed in the appended claims.

I claim:

1. Apparatus for desolventizing and toasting extracted solids from a solvent extraction system, which comprises a plurality of closed, superposed and separate heated chambers separated by a common wall and connected in series by valve-controlled passages to pass solids by gravity through said series of chambers in succession, means individual to the chambers for controlling said passages to maintain an unbroken layer of solids across the entire floor of each chamber, means for heating the contents of said chambers and controlling the temperature of each individually and independently of the others, means for stirring the solids in each of said chambers without breaking said unbroken layer, means for mixing live steam with the solids in one of said chambers after the first one of the series, a vent opening in each of said common walls, separate from said passages for connecting vapor space above said one chamber and those above it in series for the passage of vapors from chamber to chamber upwardly from said one chamber, in a direction counter to the travel of the solids from chamber to chamber, an outlet from the upper part of the first chamber of the series for connection to a condenser, and a suction source connected to said chambers after said one chamber for removing vapors therefrom.

2. Apparatus for desolventizing and toasting extracted solids from a solvent extraction system, which comprises a plurality of closed and separate, superposed, heated chambers having gate-controlled passages from chamber to chamber and connecting said chambers in series, and to discharge solids from the bottom chamber, means for controlling said gate controlled passages to maintain an unbroken layer of solids on the floor of each chamber, means for stirring the contents of each chamber without rupturing said unbroken layer therein, a steam outlet opening into one of said chambers after the first in the series, a continuously open vent passage connecting said one chamber after the first to said top chamber through the floor of said top chamber, a condenser connected to the upper part of the top chamber to remove vapors therefrom and condense them, and a source of suction connected to each chamber after said one chamber after the first for removing vapors therefrom.

3. Apparatus for desolventizing extracted solids from a solvent extraction system, which comprises a plurality of closed and separate, superposed, heated chambers having gate-controlled passages from chamber to chamber and connecting said chambers in series, and to discharge solids from the bottom chamber, means for controlling said gate controlled passages to maintain an unbroken layer of solids on the floor of each chamber, means for stirring the contents of each chamber without rupturing said unbroken layer therein, a steam outlet opening into one of said chambers after the first in the series, an open vent passage opening upwardly through the floor of said first chamber in the series and connecting said one chamber after the first to said top chamber through the floor of the latter below said unbroken layer, and a condenser connected to the top chamber to remove vapors therefrom and condense them.

4. Apparatus for desolventizing and toasting extracted solids from a solvent extraction system, which comprises a plurality of closed and separate, superposed, heated chambers having gate-controlled passages from chamber to chamber and connecting said chambers in series, and to discharge solids from the bottom chamber, means for regulating said gate controlled passages from the solids in each chamber to maintain an unbroken layer of solids on the floor of each chamber, a shaft passing vertically into each of said chambers and mounted for rotation, said shaft and chamber floor having close contact, a stirrer arm on said shaft in each chamber and sweeping the bottom of that chamber, said shaft having a descending steam passage therein from the upper end, a pipe connected to said passage in one of said chambers after the first in the series, passing along the trailing edge of said arm and having openings into that one chamber to discharge steam into solids falling over said arm of that chamber, an open vent passage connecting said one chamber after the first with the top chamber of the series through the floor of the top chamber, a vapor outlet from said top chamber to remove, for condensing, vapors from that chamber, and a vapor outlet from said chambers of the series after said one chamber after the first, which is distinct and closed from said first vapor outlet.

5. Apparatus for desolventizing extracted solids from a solvent extraction system, which comprises a plurality of closed and separate, superposed, heated chambers having gate-controlled passages from chamber to chamber and connecting said chambers in series, and to discharge solids from the bottom chamber, means for regulating said gate controlled passages from the solids in each chamber to maintain an unbroken layer of solids on the floor of each chamber, a shaft passing vertically into each of said chambers and mounted for rotation, a stirrer arm on said shaft in each chamber and sweeping the bottom of that chamber, said shaft having a descending steam passage therein from the upper end, a pipe connected to said passage in one of said chambers after the first in the series, passing along the trailing edge of said arm and having openings into that one chamber to discharge steam into solids falling over said arm of that chamber, an open vent passage connecting said one chamber after the first with the top chamber of the series through the floor of the top chamber, and a vapor outlet from said top chamber to remove, for condensing, vapors from that chamber.

6. Apparatus for desolventizing and toasting extracted solids from a solvent extraction system, which comprises a plurality of closed and separate, superposed, heated chambers having gate-controlled passages from chamber to chamber and connecting said chambers in a descending series, and to discharge solids from the bottom chamber, means for regulating said gate controlled passages from the solids in each chamber to maintain an unbroken layer of solids on the floor of each chamber, a shaft passing vertically with a close fit into each of said chambers and mounted for rotation, a stirrer arm on said shaft in each chamber and sweeping the bottom of that chamber, said shaft having a descending steam passage therein from the upper end, a pipe connected to said passage in one of said chambers after the first in the series, passing along the trailing edge of said arm in that chamber and having openings into that chamber to discharge steam into solids falling over said arm of that chamber, an open vent passage connecting said one chamber with the top chamber of the series through the floor of the top chamber, a condenser connected to the top chamber to remove vapors therefrom and condense them, an auxiliary vapor outlet from each of said chambers below said one chamber after the first in said series, which is distinct and closed from said first vapor outlet, and a source of suction connected to said auxiliary outlet.

7. Apparatus for desolventizing extracted solids from a solvent extraction system, which comprises a plurality of closed and separate, superposed, heated chambers having gate-controlled passages from chamber to chamber and connecting said chambers in a descending series, and to discharge solids from the bottom chamber, means for regulating said gate controlled passages from the solids in each chamber to maintain an unbroken layer of solids on the floor of each chamber, a shaft passing vertically into each of said chambers and mounted for rotation, a stirrer arm on said shaft in each chamber and sweeping the bottom of that chamber, said shaft having a descending steam passage therein from the upper end, a pipe connected to said passage in one of said chambers after the first in the series, passing along the trailing edge of said arm in that chamber and having openings into that chamber to discharge steam into solids falling over said arm of that chamber, an open vent passage connecting said one chamber with the top chamber through the floor of said top chamber, and a condenser connected to the top chamber to remove vapors therefrom and condense them.

8. Apparatus for desolventizing extracted solids from a solvent extraction system, which comprises a series of closed and separate chambers arranged at successively lower levels, with a gate-controlled passage from the bottom of each chamber to the next lower chamber in the series until the last one of the series and that last chamber of the series having a gate-controlled discharge passage, means for maintaining a substantial depth of solids in each chamber by individual regulation of said gate-controlled passages, vent passages separate from the gate-controlled passages, connecting the lower part of each chamber below the level of solids therein to the upper part of the next lower chamber until the lowermost chamber is reached, a rotatable stirrer in each chamber and sweeping the floor of that chamber to loosen, at intervals, and mix the mass of solids in each chamber and move the solids over the discharge passage from that chamber, a condenser connected to the upper part of the uppermost one of said chambers for removing and condensing vapors from that chamber, an inlet conduit opening into the upper part of said uppermost chamber for delivering thereto solids to be desolventized, and means for delivering live steam into the lower part of at least one of said chambers below said uppermost chamber, whereby steam released in a chamber will rise through the solids in that chamber and in succession through each chamber above it to vaporize and carry with it any adherent solvent, the generally quiescent layer of wet solids in each chamber through which the steam and vapors pass scrubbing the vapors of any entrained dust.

9. Apparatus for desolventizing extracted solids from a solvent extraction system, which comprises a plurality of closed and separate superposed chambers, each having an individual, gate-controlled discharge passage in its bottom opening into the chamber next below it and from the lowermost chamber, a shaft passing vertically into each of said chambers and mounted for rotation, a stirrer arm in each chamber and coupled to said shaft for rotation therewith, in close proximity to the floor of that chamber, a vent opening in the floor of each chamber above the lowermost chamber, separate from the gate-controlled passages, opening into the next lower chamber and formed at its upper end to be fully and continuously bridged by a layer of said solids resting on the floor of that chamber, a vapor outlet connected to the upper part of the uppermost of said chambers, a charging inlet also opening into the upper part of said uppermost chamber for delivering into that chamber the solids to be desolventized, means for individually operating the gate-controlled passages to maintain a substantial, unbroken level of solids on the floor of each chamber, and means for admitting steam to at least one of the chambers below the uppermost chamber, whereby the steam will penetrate the solids of that chamber and pass upwardly through the layers of solids in the chambers above it.

10. Apparatus for desolventizing extracted solids from a solvent extraction system, which comprises a plurality of closed and separate superposed chambers, each having an individual gate-controlled discharge passage in its bottom opening into the chamber next below it and from the lowermost chamber, a shaft passing vertically into each of said chambers and mounted for rotation, a stirrer arm in each chamber and coupled to said shaft for rotation therewith in close proximity to the floor of that chamber, a vent opening in the floor of each chamber above the lowermost chamber, separate from the gate-controlled passages, opening into the next lower chamber and formed at its upper end to be fully and continuously bridged by a layer of said solids resting on the floor of that chamber, a vapor outlet connected to the upper part of the uppermost of said chambers, a charging inlet also opening into the upper part of said uppermost chamber for delivering into that chamber the solids to be desolventized, means for individually operating the gate-controlled passages to maintain a substantial, unbroken level of solids on the floor of each chamber, and means for admitting steam to at least one of the chambers below the uppermost chamber, closely adjacent the trailing edge of the stirrer arm in that chamber, whereby the steam will penetrate the solids of that chamber and pass upwardly through the layers of solids in the chambers above it.

11. Apparatus for desolventizing solvent-wet solids from a solvent extraction system comprising a plurality of closed, superimposed, and separate chambers having floors, passages formed in said floors to transfer the solids in one chamber to the next successive chamber, valve means for each of said passages, means for actuating the valve means to enable the solids in each chamber to be transferred to the next, a shaft extending through the chambers and floors and having a close fit with said floors to preclude significant passage of solids through the floors around the shaft, means on the shaft in each of said chambers and adjacent said floors for stirring the solids in said chambers, means for independently heating the chambers and for controlling the temperatures thereof, a screened vent opening formed in the floor of each of said chambers for the transmission of vapors from each chamber to the one preceding, said screened openings having apertures of such size as to preclude the significant passage of solids therethrough, said screened openings being separate from said passages, an additional vent opening formed in the uppermost chamber and above the floor thereof through which vapors may be withdrawn, and means for admitting live steam to at least some of said chambers adjacent the floors thereof, whereby the steam may rise into the solids in said chambers and evaporated solvent and uncondensed steam may be withdrawn through said additional vent opening.

12. The method of desolventizing solvent extracted solid residues from a solvent extraction system wherein the solvent-wet residues have been separated from the bulk of the miscella containing the soluble constituents initially contained in such solids, and wherein the solvent has a boiling point at atmospheric pressure below the boiling point of water, which comprises passing said solids and entrained solvent as a loose mass through a series of independent but connected closed chambers and from the first of the series to the last, maintaining each of said chambers at selected temperatures, the temperature of the first of the series being above the boiling point of the solvent and below the boiling point of water, the temperature in at least one successive chamber being above the boiling point of water, maintaining the solids in each chamber during the time they are in such chamber as a bed of loose solids of appreciable depth and free of direct passages from face to face therethrough, locally stirring the solids in each chamber in addition to any stirring caused by movement of the solids from chamber to chamber, periodically transferring the solids in each chamber to the next in the series, maintaining the volume of the solids in each chamber at less than the volume of the chamber itself thereby to provide a vapor space above each bed, introducing live steam in at least one of said chambers below the bed of solids therein, providing a vapor passage between the chambers for counterflow of vapors with respect to the solids and ultimately into the first chamber of the series, whereby steam entering the first chamber of the series will condense on the solids therein to moisten the solids and the heat of vaporization will evaporate solvent for movement upwardly through said solids, the bed of solids thereby providing a filter for retaining dust-like particles of the solids, reevaporating some of the condensed steam in at least one chamber after the first in the series by the increased temperature therein thereby to regenerate steam for flow into the first chamber with concomitant heat transfer, recondensation, and solvent evaporation, withdrawing from the vapor space above the first bed of solids a mixture of solvent vapor and entrained water vapor, and condensing the mixture outside of the chambers for recovery of solvent.

13. A method as set forth in claim 12, characterized by the additional steps of maintaining the temperature in the last chamber of the series above the boiling point of water, retaining the solids therein for a sufficient length of time to evaporate some of the moisture contained therein, and withdrawing the so-evaporated moisture from the chamber, thereby to toast or cook the solids for improvement of appearance, nutritive value, and keeping properties.

14. The method of desolventizing extracted solid residues from a solvent extraction system wherein the solvent-saturated solids have been separated largely from the miscella containing the soluble constituents initially contained in such solids, which solvent has a boiling point at atmospheric pressure below the boiling point of water, which comprises passing said solids and adherent solvent as a loose mass through a series of separate but connected closed chambers, maintaining the temperature of the first chamber of the series below the boiling point of water but high enough to vaporize a mixture of solvent vapor and entrained water vapor, the temperature of the last of the series being above the boiling point of water and the temperatures of the intermediate chambers being in the range between and including those of the first and last chambers of the series, maintaining said solids in each chamber while they are in that chamber as a bed of loose solids of appreciable depth and free of direct passages from face to face therethrough, locally stirring the solids in each chamber in addition to any stirring caused by the movement of the solids from each chamber to the next of the series, maintaining the volume of the solids in each chamber at less than the volume of that chamber itself to provide a vapor space above each bed, introducing live steam into at least one of the chambers below the bed therein, passing vapors from the top of each chamber below the first of the series to the bottom of the next preceding chamber of the series independently of the movement of solids from chamber to chamber to provide a counterflow of vapors and solids through the series and ultimately of the vapor into the first chamber of the series, whereby steam entering the first chamber of the series will condense and moisten the solids therein and by its liberated heat of vaporization will liberate a mixture of solvent vapor and entrained water vapor from the solids of that first chamber of the series, withdrawing from the space above the solids in the first chamber of the series, the liberated mixture of solvent vapor and entrained water vapor, and condensing the removed mixture of vapors outside of the series for recovery of solvent.

15. The method of desolventizing extracted solid residues from a solvent extraction system wherein the solvent-saturated solids have been separated largely from the miscella containing the soluble constituents initially contained in such solids, which solvent has a boiling point at atmospheric pressure below the boiling point of water, which comprises passing said solids and adherent solvent as a loose mass through a series of separate but connected closed chambers, controlling the flow of said solids through each chamber so as to maintain in each chamber a bed of loose solids of appreciable depth and free of direct passages from face to face therethrough, locally stirring the solids in each chamber in addition to any stirring caused by the movement of the solids from chamber to chamber, introducing live steam into at least one of said chambers below the bed of solids therein, passing vapors from the top of each chamber below the first of the series to the bottom of the next preceding chamber of the series below the level of solids therein and independently of the passage of solids from chamber to chamber, to provide a counterflow of vapors and solids from chamber to chamber, with the vapors ultimately passing through the bed in the chamber of the first of said series, whereby suspended fine particles of solids are filtered out by the solids of that chamber, additionally controlling the temperatures in the various chambers, with a temperature in the first chamber of the series below the boiling point of water but sufficient to vaporize the solvent with any entrained water vapor, the temperature in the other chambers in the series being higher than in the first chamber, and in at least one of them above the boiling point of water, and withdrawing the vapors collecting in the upper part of the first chamber of the series and condensing them outside of the series for recovery of solvent.

16. The method of desolventizing extracted solid residues from a solvent extraction system wherein the solvent-saturated solids have been separated largely from the miscella containing the soluble constituents initially contained in such solids, which solvent has a boiling point at atmospheric pressure below the boiling point of water, which comprises passing said solids and adherent solvent as a loose mass through a series of separate but connected closed chambers, controlling the flow of said solids through each chamber so as to maintain a bed of the loose solids in each chamber of appreciable depth and free of direct passages from face to face therethrough, locally stirring the solids in each chamber in addition to any stirring caused by the movement of the solids from chamber to chamber, introducing live steam into at least one of said chambers below the bed of solids therein, passing vapors from the top of each chamber below the first of the series to the bottom of the next preceding chamber of the series below the level of solids therein, to provide a counterflow of vapors and solids from chamber to chamber, with the vapors ultimately passing through the bed in the chamber of the first of said series, whereby suspended fine particles of solids are filtered out by the solids of that chamber, additionally controlling the temperatures in the various chambers, with a temperature in the first chamber of the series below the boiling point of water but sufficient to vaporize the solvent with any entrained water vapor, the temperature in the other chambers in the series being higher than in the first chamber, and in at least one of them above the boiling point of water, and withdrawing the vapors collecting in the upper part of the first chamber of the series and condensing them outside of the series for recovery of solvent.

References Cited in the file of this patent

UNITED STATES PATENTS

| Number | Name | Date |
| --- | --- | --- |
| 251,847 | Duryea | Jan. 3, 1882 |
| 705,787 | Pratt | July 29, 1902 |
| 985,217 | Sleeper | Feb. 28, 1911 |
| 1,261,005 | Barstow et al. | Apr. 2, 1918 |
| 1,410,063 | Huillard | Mar. 21, 1922 |
| 1,431,107 | Faherty | Oct. 3, 1922 |
| 1,666,617 | Caldwell | Apr. 17, 1928 |
| 1,749,525 | Bleil | Mar. 4, 1930 |
| 1,782,714 | Davidson | Nov. 25, 1930 |
| 2,033,169 | Zeun | Mar. 10, 1936 |
| 2,099,634 | Thorp et al. | Nov. 16, 1937 |
| 2,254,867 | Bonotto | Sept. 2, 1941 |
| 2,334,015 | Levine et al. | Nov. 9, 1943 |
| 2,467,435 | Langhurst | Apr. 19, 1949 |
| 2,571,143 | Leslie | Oct. 16, 1951 |
| 2,585,793 | Kruse | Feb. 12, 1952 |